Nov. 19, 1957     R. T. COLLIER     2,813,822
APPARATUS AND METHOD FOR CALCINING PETROLEUM
COKE, COAL AND SIMILAR SUBSTANCES CONTAINING
VOLATILE COMBUSTIBLE MATERIAL
Filed Nov. 24, 1952     2 Sheets-Sheet 1
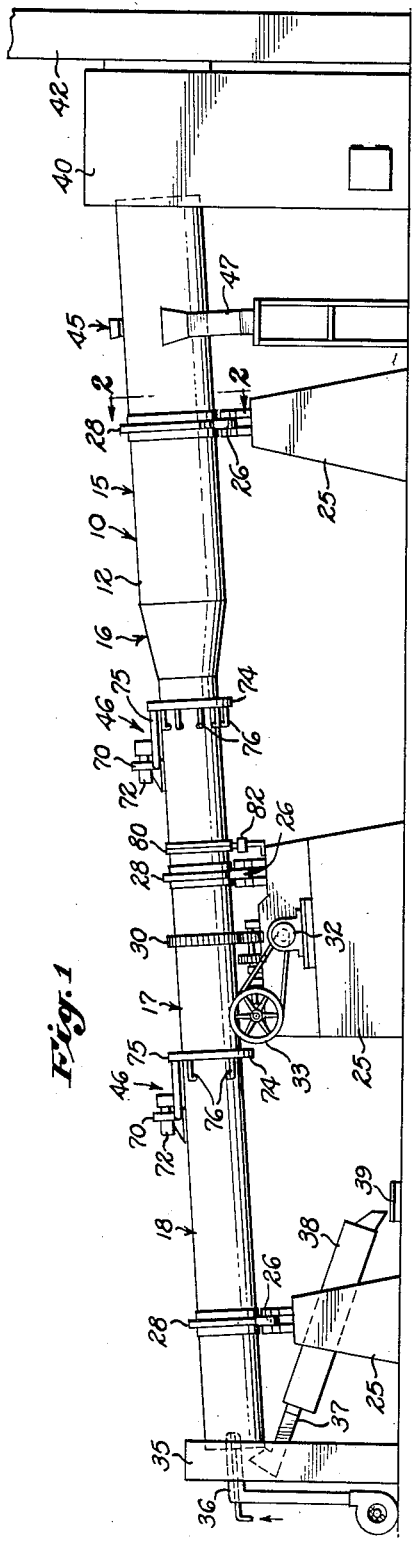
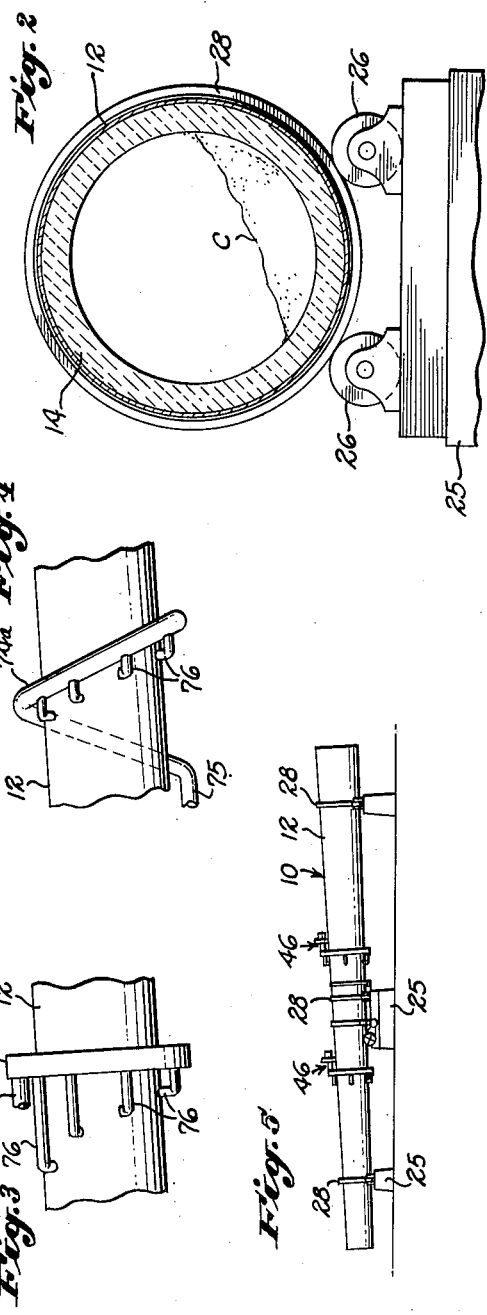
INVENTOR:
ROBERT T. COLLIER
BY HIS ATTORNEYS
HARRIS, KIECH, FOSTER & HARRIS

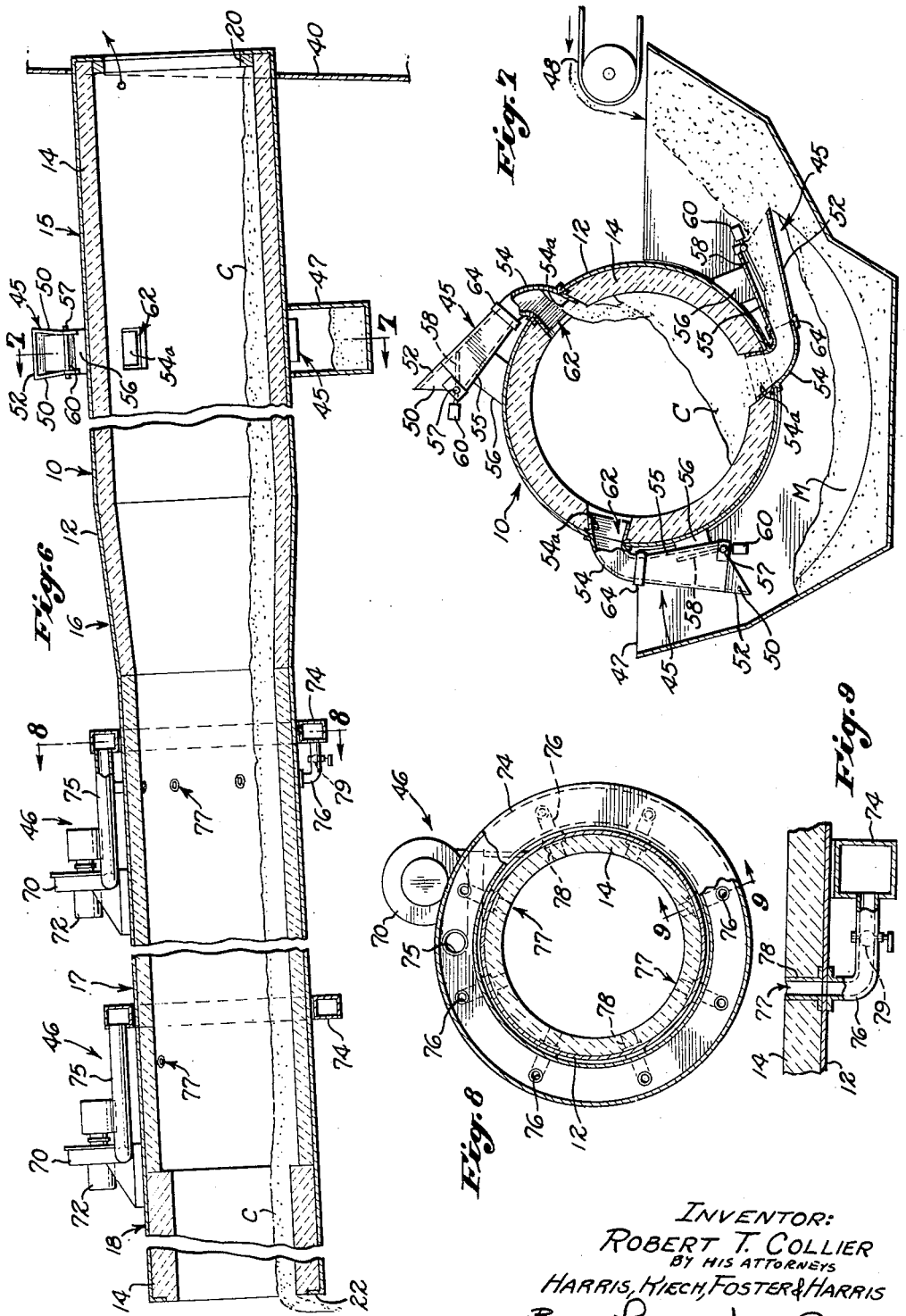

United States Patent Office 2,813,822
Patented Nov. 19, 1957

2,813,822

APPARATUS AND METHOD FOR CALCINING PETROLEUM COKE, COAL AND SIMILAR SUBSTANCES CONTAINING VOLATILE COMBUSTIBLE MATERIAL

Robert T. Collier, Palos Verdes Estates, Calif., assignor to Collier Carbon and Chemical Corporation, Los Angeles, Calif., a corporation of California Application November 24, 1952, Serial No. 322,308

9 Claims. (Cl. 202—6)

This invention relates in general to improvements in the art of calcining materials containing volatile combustible matter. It is specifically applicable to the calcining of green petroleum coke in a rotary type kiln, but is not limited thereto since it is applicable also to the calcining or heating of coal or other substances containing volatile combustible materials which are releasable during the process of heating or calcining, as in the production of coke from coal whether of bituminous, anthracitic or other form.

An object of the invention is to provide a method and apparatus for producing a calcined coke with higher yield and at lower cost than has been accomplished heretofore. It is also an object of the invention to provide an apparatus and a procedure for heating petroleum coke, or coal or the like, in an upper or feed portion of the kiln to a temperature level which is only slightly below the final calcining temperature (for example 200° to 600° F. below or around 400° F. to 500° F. below the final temperature) while making provisions for the burning of the volatile combustible materials liberated in said feed portion of the kiln at such temperatures, whereby to facilitate calcination. It is also an object of the invention to accomplish such burning of the released volatile combustible materials by providing for controlled introduction of air (or other oxygen-containing gas) into such portion of the kiln under conditions to take advantage of the heat available in such volatile materials and thereby improve the over-all heating efficiency of the process in the apparatus in which the process is conducted.

Another object of the invention is ot provide a calcining kiln whose cross-sectional diameter increases, gradually or section by section, from the lower or discharge end of the kiln to the upper or feed end of the kiln, such cross-sectional change corresponding at least roughly with the volume of gases evolved and present in the various sections. In other words, the cross-sectional areas of the various sections are approximately proportional to the volumes of gases in the various sections of the kiln. Such difference in cross-sectional areas takes into consideration the heat factor including combustion of evolved gases in various zones.

Another object of the invention is to control the velocity of gas movement through the kiln to the upper or feed end thereof and discharge therefrom so as to avoid entrainment of fine feed materials. Such control avoids loss of these materials in the scrubber or transition section through which the gases pass from the upper or feed end of the kiln to the stack.

It is a still further object of the invention to take advantage of the volatile combustible materials released in the various zones of the kiln and to supply adequately controlled volumes of air thereto for approximately complete combustion thereof whereby to employ the resultant heat for proper calcination of the feed material and for reduction of the content of volatile combustible materials to a practical or optimum minimum.

A further object of the invention is to increase the retention time for the material in the upper or feed section of the kiln, and to construct the upper section of the kiln to effect such greater retention, so as to release in such section of the kiln greater proportions of the volatile combustible materials and to improve calcination of the feed materials in said zone by adequate combustion thereof. Such an increased retention time may be effected by providing an appreciably greater diameter for the upper or feed end of the kiln than for succeeding sections of the kiln nearer the discharge end. Such a construction results in a greater depth of the bed of materials in the upper end of the kiln, thereby increasing the residence time therein.

It is therefore another object of this invention to provide for increased bed depth in the upper end of the kiln, as compared with bed depth in lower portions of the kiln, and thereby increase both the volume of materials retained in the upper section and the residence time of the materials undergoing calcination in the upper end of the kiln, thereby also increasing the release of volatile combustible materials as well as improving calcination.

It is also an object of the invention to provide means for the introduction of air into the interior of a kiln, which means will not be easily burned out and by which air introduction may be easily and efficiently controlled.

I have found an efficient, and at present preferred apparatus to be a slightly inclined rotary kiln which is lined with firebrick and is provided with an internal diameter at its upper or feed end substantially greater than the internal diameter of the lowermost or discharge end, means being provided adjacent the lower portion of the upper section to promote substantially complete combustion of all of the volatile combustible materials released in the described upper section of greater diameter. In one apparatus, for example, the internal diameter of the upper section is about six feet, the internal diameter of the lower portions being in the order of four and one-half to five feet, where the upper section in such an apparatus has a length of around thirty-five to forty feet, the lower sections approximating sixty to sixty-five feet, or, in other words, an over-all length of about one hundred feet. In such a preferred apparatus, plural air injection means have been arranged around the periphery of the lower end of the large-diameter upper section, whereby to introduce air under pressure (as by means of blowers) to satisfy the volatile combustible materials released in the resultant bed which is of much greater depth than calcining bed depths heretofore known. The slope of the axis of the kiln is in the order of ½ to ¾ of one inch per foot, an optimum apparently being ⅝ inch slope per lineal foot. At an intermediate point in the lower section, which may represent a point of further reduction in diameter within the kiln (for example a reduction of an internal diameter of five feet to an internal diameter of four and one-half feet), additional air-injecting means may be employed to satisfy combustion of additional volatile combustible materials being released in a middle section of the kiln. Since, by this process and with this apparatus, most of the heat required for proper calcination is furnished by the volatile combustible materials being released from the feed, the introduction of only a relatively small amount of fuel is required at the discharge end of the kiln for the purpose of completing calcination.

With such a construction as herein disclosed, pressures resulting from release ot volatile combustible materials and from combustion thereof are so controlled by the increased capacity of the upper portion of the kiln resulting from the increased diameters that high pressures, which are typical of uniform diameter kilns and result in high velocities of gases from the upper end of the kiln to the conventional scrubber, are avoided. Thus, at the lower or discharge end of the kiln, fuel introduced, which is only sufficient to complete calcination, burns in a zone of equalized or even negative pressure, that is, all these gases of combustion continue through the kiln to the feed end to be delivered into the scrubber. Therefore, at the lower end of the kiln, around the "nose ring," there is usually an automatic air intake as the result of the draft through the upper end of the kiln, which air intake serves admirably to cool the nose ring typically found at the lower end of rotary kilns of this general type and acting to position the brick lining of the kiln. Even with the burning of the volatile combustible materials, the indicated large diameter of the upper or feed end of the kiln and correspondingly large diameter of the "tail ring" at such end provide adequate discharge area for the gases, thereby reducing the pressure and velocity in the kiln. By providing an optimum diameter of the tail ring at the feed end of the kiln, a large commercial capacity of the kiln is obtainable which may be increased up to its maximum by increasing rotation to a practical operating maximum, as will be apparent to those skilled in the art of calcining with rotary kilns.

The decreasing of the diameter of the kiln from the feed end toward the discharge end amounts to a tapering of the kiln, which effect, however, has been found to be conveniently and commercially accomplished for optimum results by stepping internal diameters as above indicated.

In operation, about two thirds of the volatile combustible materials is driven off and burned in the large, upper end of the kiln described, and it has been found that, especially where operating with petroleum coke, calcining temperatures in the lower portion of the kiln must be run up at least to 2200° F. and preferably to around 2500° F. (or between about 2450° F. and 2600° F.) to get a good coke whose volatile combustible content is less than 1% as is commercially required for good calcined carbon for most uses. Thus, operating at 2000° F. for a longer period of time is not effective to eliminate the volatile combustible materials to the extent desired. By burning the released volatile combustible materials and thereby taking advantage of resultant heat, the amount of fuel required to be introduced at the lower end of the kiln is reduced as much as 50% over ordinary operation, and as a consequence of this factor and greater yield, the cost of production of the calcined product is reduced more than 25%. Passage time of a given portion of the feed material through the kiln may vary from about thirty minutes to about one hour in accordance with the length of the kiln, the slope of the kiln, the rate of rotation and the rate of charge, as hereinafter explained. It is also possible, by appropriate air regulation and fuel addition at the discharge end, to reach as much as 3000° F. or similar temperature, if it be desired, to produce graphitized coke or some other high temperature effect.

Another object of the invention is to provide a novel arrangement of feed means, such as scoop means, which opens through the kiln wall into the feed section at an appreciable distance downward from the tail ring so that the cross-sectional area at the tail ring is left unobstructed, as distinguished from the conventional positioning of feed means to project through and partially obstruct the tail ring, thereby increasing the velocity of the discharging gases. By omitting means projecting through the tail ring and by using an enlarged diameter feed section, gas velocities are reduced to an optimum and loss of fines to the scrubber which would otherwise result is substantially eliminated. Also, even though the internal diameter of the kiln is not tapered or otherwise reduced from its feed end toward its discharge end, gas velocities from the feed end are reduced materially by the mentioned omission of the usual feed means projecting through the tail ring into the feed section, and good combustion is effected by the introduction of air under pressure to properly support combustion as herein described. Gas velocity from the discharge end is further decreased if the usual upstanding tail ring is omitted. Thus, important advantages of the invention are obtained by the two features of supplying air under pressure and by eliminating feed means of the type which project through the tail ring and obstruct gas discharge, even though there be no decrease in the cross-sectional area at the discharge end under that of the feed end.

Various other features of the invention, and other objects thereof, will become apparent to those skilled in this art upon reference to the accompanying drawings and the following specification wherein presently successful and preferred methods of operation and equipment are disclosed.

In the drawings:

Fig. 1 is a side elevation of an elongated rotary kiln embodying the novel features of the present invention;

Fig. 2 is an enlarged cross section through the upper section of the kiln of Fig. 1 as indicated by the section line 2—2 of Fig. 1;

Figs. 3 and 4 are elevational details indicating two arrangements by means of which air jets supplying air under pressure into the kiln may be staggered so as to extend air introduction for an appreciable distance along the kiln length;

Fig. 5 diagrammatically illustrates a tapered kiln which might be used in some circumstances instead of the stepped structure of the presently preferred form of apparatus;

Fig. 6 is a longitudinal sectional detail, on an enlarged scale of the upper section and a portion of the intermediate section of the kiln of Fig. 1, portions being broken away;

Fig. 7 is an enlarged cross-sectional detail, with portions shown in elevation, taken from the line 7—7 of Fig. 6 to show the arrangement of the scoop feeders which supply the first section or feed section of the kiln and are spaced a convenient distance down the kiln from the upper end or tail ring;

Fig. 8 is a similar cross section on a corresponding scale taken on the line 8—8 of Fig. 6 and showing the blower and air manifold ring arrangement by which air under pressure is introduced through different jets to provide for complete combustion of volatile materials being released in the upper or feed section of the kiln (or other corresponding kiln section); and Fig. 9 is a sectional detail taken on the line 9—9 of Fig. 8 showing how the air jets are preferably led into the kiln on the down side of the air manifold ring.

In the drawings the elongated kiln is generally indicated at 10, and primarily it comprises a plurality of sections of different internal diameters each of which has an outer shell 12 and appropriate firebrick lining 14 or other appropriate refractory lining as indicated especially in Figs. 2, 6 and 7. The kiln sections include an upper feed section 15 of greatest diameter and of appreciable length, a relatively very short tapered connecting section 16, an intermediate section 17 which, as best seen in Fig. 6, provides an internal diameter smaller than the internal diameter of the section 15, and a lower end section 18 whose internal diameter is still smaller than the internal diameter of the intermediate section 17. This last reduction in internal diameter is conveniently effected by increasing the thickness of the refractory lining 14 for the section 18. Thus, with these two sections 17 and 18 in the form shown, the same diameter of outer shell 12 is used. At the upper end of the kiln the firebrick or other refractory lining 14 is built up to form a tail ring 20 which may serve to confine the upper end of the material bed and to aid in determining the thickness of the bed C' of material undergoing calcination. The elevation of this tail ring 20 from the inner surface of the adjacent refractory lining 14, and adjacent the upper end of the bed of material, may be in the order of six inches to nine inches where the internal diameter of the upper section of the kiln is in the order of six feet. This over-all reduction of the internal diameter at the tail ring, amounting to twelve inches to eighteen inches, is entirely acceptable in this construction where the area of the resultant discharge opening for the gases is not in any way obstructed by means for feeding the kiln, and where the internal diameter of the lower kiln section 18 approximates that of the tail ring 20 or is less and is in the order of four and one-half to five feet. At the lower end of the kiln, the nose ring does not extend radially beyond the inner surface of the adjacent refractory lining 14, and therefore may be nothing more than the lowermost end of such lining or a flange 22 on the extremity of the shell 12 as shown, or as in conventional constructions.

The kiln 10 is borne upon several base members 25 distributed along its length through the medium of corresponding pairs of supporting rollers 26 which may be of conventional construction or as indicated in Fig. 2, these rollers receiving conventional tires 28 mounted upon the shell 12 according to conventional construction. The kiln 10 is rotated through the medium of a conventional ring gear 30 mounted upon the shell 12 as seen in Fig. 1, rotation being effected through the medium of any appropriate motor 32 and speed reduction means generally indicated at 33 and including such sprockets, drive chains, and spur gears as may be necessary in accordance with well known practices. As illustrated, there is disposed at the lower end of the kiln a conventional head wall 35 providing peep holes and the like and through which a conventional burner 36 projects for the purpose of firing the lowermost end of the kiln with natural gas or equivalent fuel. The head wall 35 is also shown as carrying a discharge chute 37 feeding to any appropriate cooling conveyor 38 which discharges to any means, such as a conveyor belt 39, for moving the calcined material to storage or otherwise as required. At the upper end of the kiln there is located the usual so-called scrubber 40 which receives the gaseous products of combustion being discharged from the kiln, and in which any fines which are entrained by the discharging gases and which are not burned are permitted to settle out. In conventional kilns a considerable quantity of settled fines accumulates in the scrubber 40, but with the present structure the settling fines are almost negligible. The top of the scrubber in turn discharges into a conventional stack 42 from the top of which the spent products of combustion escape as usual.

In addition to the reduction of the internal diameter of the lower portions of the kiln to something less than the internal diameter of the upper feed section 15 of the kiln, important aspects of the present invention reside in the use of scoops 45 as raw material feeding means at an intermediate location on the wall of the upper section 15, and the use of means generally indicated at 46 for supplying air under pressure to the interior of the kiln, at such locations as best adapted to optimum operation, as seen in Figs. 1 and 6. The scoops 45 are exteriorly disposed upon the kiln walls as best indicated in Fig. 7. They are supplied by dipping into a quantity of feed material M contained in a hopper 47 underlying the kiln at the location of the scoops thereon, as seen in Figs. 1, 6 and 7; this hopper 47 being in turn supplied by an endless conveyor belt 48, Fig. 7. The number of scoops is that conveniently necessary for supplying the desired amount of feed to the kiln 10, of which three of the relative sizes and capacities indicated have been found satisfactory for all rotational speeds to which this type of kiln is adapted. Each scoop 45 is conveniently rectangular in cross section at its outer pick-up extremity, this construction being provided by side walls 50 which are parallel, an outer wall 52 substantially parallel to the tangent at the adjacent point of connection of a curved throat member 54 to the shell 12, and an inner wall 55 which flares slightly inward toward the kiln and with respect to the wall 52 and is anchored at 56 to the shell 12 of the kiln. These walls 50, 52 and 55 are conveniently flat walls as shown. The outer end of the inner wall 55 provides a mounting for a pivot 57 of a flap type closing gate 58 preferably operated by gravity through the medium of a weight 60 to overbalance the gate 58 and close it when the respective scoop 45 reaches a suitably elevated point in its rotational travel, which is somewhat short of that indicated at the top of Fig. 7. However, the gate 58 of each scoop may be actuated by appropriate mechanical means, rather than by gravity, if preferred.

Each curved throat 54 makes a substantially rightangular bend so that it will feed into the kiln in a substantially radial direction through a corresponding discharge port 62 formed in the shell 12 and in the refractory lining 14. The throat 54 is conveniently secured to the shell 12 by bolting, riveting or welding, and it may communicate with an effective extension 54a (Fig. 7) which may serve as a liner for at least a portion of the refractory material 14 at the port 62. Any appropriate means is applied for effecting a joint 64 between the outer end of the curved throat 54 and the adjacent ends of the walls 50, 52, 55 constituting the pick-up portion of the scoop. Such a joint may include riveting, bolts or welding as most efficient for the purpose.

In operation of each of the scoops 45 its flap gate 58 will open by gravity as it approaches the position shown at the left of Fig. 7. The forward edges of the walls 50 and 52 dip into the feed material M in the hopper 47. As the scoop approaches the position shown at the bottom of Fig. 7, the throat 54 and its extension 54a become filled with calcining material C which is tumbling in the kiln and assumes an angle of repose of around 35° or 40° approximately as indicated in Fig. 7. The calcining material C is, of course, shortly abutted by the cold feed material M being scooped up.

In the continued travel of the lower scoop 45 toward the position at the top of Fig. 7, the calcining material C in the extension 54a begins to discharge by gravity as soon as the port 62 reaches the upper edge of the bed of material C, which bed is, of course, somewhat elevated at the respective side due to the rotation of the kiln. Following discharge of the hot material C, the cold material M then commences to discharge through the lower end of the main scoop section provided by the walls 50, 52 and 55 and into the curved throat 54, whence it is dumped through the port 62 into the kiln on the bed of material undergoing agitation and calcination. The flare between the outer wall 52 and the inner wall 55 of the scoop is limited so that there will be no tendency of the cold material M to clog at the lower end of the main scoop section as it passes through the curved throat 54. The direction of the outer scoop wall 52 is that best calculated to provide for dropping of the cold material M into the kiln as quickly as possible after the upper edge of the calcining mass C has been passed. As previously indicated, the direction of the outer wall 52 is approximately parallel to the tangent at the median point of attachment to the shell 12 at the respective port 62; or the axis of the scoop may be substantially parallel to such tangent so that the wall 52 is directed only slightly outward away from such tangent. In other words, the outer wall 52, or the axis of the scoop 45, will be roughly perpendicular to the radius at the median point of attachment of the curved throat 54. This arrangement effects good discharge of the cold material M into the kiln by way of the curved throat 54. The latter, which may be a stainless steel casting, is, by reason of parallel opposite sides, substantially rectangular at any cross section to correspond generally with the cross section at the bottom of the outer, main scoop section, thereby to receive freely from the outer scoop section and to discharge readily into the kiln. The position of the inner scoop wall 55 is that best calculated with respect to the angle of repose of the feed material to provide sufficient time for the feed material to drop into the kiln before the angle of repose of the feed material in the outer portion of the feed scoop is reached, while at the same time permitting adequate filling of the scoop as it passes through the hopper 47. Further, under different sets of operating conditions (e. g., different speeds of rotation or different angles of repose of different feed materials) the inner and outer scoop walls may be placed either closer to or farther from the shell of the kiln according as such different conditions dictate. The indicated variations in scoop positioning are variously illustrated by the three scoops of Fig. 7.

By disposing the scoops 45 downward along the kiln an appropriate distance from the tail ring 20, as presently to be explained, the scoops serve to build up an appropriate bed depth of the calcining material C approximately as indicated in Fig. 6. The depth is controlled, where the scoops are of a given size and number, by the rate of rotation of the kiln and by the amount of feed into the hopper 47. According to presently preferred operations, the depth of the bed of calcining material C may thus be varied so that its surface may be anywhere between the bottom of the tail ring 20 as it is viewed at the lower right of Fig. 6 or the top thereof and so that none of the material will discharge over the tail ring 20 as the kiln rotates. However, if no tail ring 20 is used, or if the volume of feed material is required to be reduced as where excessively volatile feed material is used, the upper end of the bed may terminate well below the location of the bottom of the tail ring 20 and even as far down the kiln as the points of discharge from the feed scoops 45.

The bed depth is, of course, thickest at what amounts to the deepest point in the kiln section 15 which is the juncture with the tapered section 16. In actual practice the bed depth may vary between about ten inches and about fourteen or fifteen inches in a kiln section of an internal diameter of six feet in the upper section 15 and tapering to an internal diameter of about five feet at the discharge end of the tapered section 16, where the section 15 is in the order of thirty to thirty-five feet in length and the scoops 45 are located about ten feet downstream from the tail ring 20 with a kiln slope in the order of five-eighths inch per foot which at present seems to be optimum slope.

Thus, in a length of ten feet from the tail ring to the scoops, with a five-eighths inch per foot slope, the increased bed depth will approximate six inches at the position of the scoops and their ports 62, the total depth at such position being increasable by the amount of elevation along the inner face of the tail ring 20, as will be obvious to the engineer operating the kiln. Another twenty feet down the kiln in the form of kiln shown employing the tapered sections, the bed will have increased in thickness correspondingly, correction, of course, having necessarily been effected by the slope of the bed of the calcining material itself as it works down the kiln during its tumbling operation. Thus, the maximum bed depth at the juncture between the kiln sections 15 and 16 under the conditions and with the dimensions stated may be about fifteen inches.

In any event, this relationship where the internal diameter at the discharge end of the tapered section 16 is appreciably less than the internal diameter of the body of the upper section 15 positively provides for an increased bed depth, an increased volume of material, and an increased residence time in the upper portion of the kiln for the material undergoing calcination. Thus, optimum conditions and the residence time are provided in the section 15 so that there may be an optimum volatilization in this zone of the volatile materials contained in the feed. In the light of the figures above given, calculation may be readily made for any other installation in order to accomplish the same results.

The other particularly important feature of the invention above mentioned resides in the positive introduction of controlled amounts of air, preferably under pressure, to attain complete combustion. Preferably a plurality of such previously mentioned air-supplying means 46 is disposed down the kiln at points below the upper, largest section 15 and the tapered section 16. These means are operated to supply adequate secondary air for substantially complete combustion of volatile combustible materials liberated in succeeding upper sections of the kiln. By such combustion, these volatiles serve to supply a large proportion of the heat necessary to effect the required calcination of the carbonaceous materials being fed into the kiln. According to one successful installation, one of the air-supplying units 46 is disposed at the upper end of the intermediate section 17 and just below the tapered section 16 so that adequate air is introduced into the upper section 15 to provide for complete combustion of the volatiles liberated in the deep bed maintained in the sections 15 and 16. Another one of the air-supplying means 46 is disposed in the vicinity of the juncture between the intermediate section 17 of the kiln and the lower section 18. As illustrated, the air jets lead into the extreme lower end of the intermediate section 17. Other dispositions of the air-supplying means may be made as best suited to provide for full combustion of the materials being volatilized in the kiln and to provide adequate heat to effect full calcination of the material being fed into the upper end of the kiln. At the extreme lower end of the kiln, the burner 36 will be used to supply the necessary fuel and the necessary air to complete calcination in the lower section 18.

Each of the air-supplying devices 46 includes a blower 70 operated by a suitable electric motor 72, and an annular air manifold 74 disposed around the respective portion of the kiln 10 and attached thereto, such manifold thus being in the form of a hollow ring which is supplied with air under pressure from the blower 70 by a feed pipe 75. From each manifold 74 there leads a plurality of air jet pipes 76 whose ends are inwardly turned toward the kiln, as illustrated in greater detail in Fig. 9, such ends being conveniently secured to the kiln wall or inner shell 12, as by welding, bolting or otherwise. Such inturned portions communicate with air inlet ports 77 as by means of air jet nipples 78 disposed within the refractory lining material 14 and secured to the inner wall of the shell 12 as illustrated in Fig. 9. Preferably the air jet pipes 76 are directed downward along the kiln from the ring manifold 74 to facilitate prevention of lodging of the calcining material C in the ports 77. However, the air jets serve well to keep the ports 77 clear. If necessary, each jet pipe 76 might be provided with other means such as an adjustable valve 79 (Figs. 6 and 9) to regulate the air flow through the pipes 76, or total air volume may be regulated at the blower itself, or otherwise, as will be apparent to the engineer, in order properly to satisfy the volatile combustibles released in the kiln.

In order to supply the motor 72 with electric energy, an appropriate contact ring 80, Fig. 1, may be mounted about the kiln 10 and insulated therefrom, this ring being connected with the motor 72 and receiving its energy through the medium of a stationary brush contact 82 carried on one of the standards 25 supporting the kiln. In cases where it may seem necessary or desirable to distribute along the kiln the air being introduced, rather than to inject it at spaced zones such as illustrated in Figs. 1 and 6, the jet pipes 76 and the air manifold may be so arranged as indicated in Figs. 3 and 4 that the points of introduction of the jet pipes 76 into the interior of the kiln are varied as by disposing the inlet ports 77 at staggered or helically arranged positions, or by any other suitable longitudinal distribution. As seen in Fig. 3, the air ducts or jet pipes 76 extending from the manifold 74 are graduated in length and they may increase in diameter as shown for the purpose of avoiding frictional pressure drops. In the form of Fig. 4, the pipe manifold 74a is arranged in a helix so that the air ducts or jet pipes 76 are substantially uniform in length and diameter.

While the lower section 18 of the kiln is shown in addition to the intermediate section 17 so as to provide an end section of smaller internal diameter than that of the section 17, it may be sufficient in some instances that the sections 17 and 18 be consolidated with a uniform internal diameter. Again while the reduction in the internal diameter of the section 18 is shown as being effected solely by increasing the thickness of the refractory lining 14, this reduction might be introduced into the structure by another tapering section, similar to the section 16, between the sections 17 and 18, as will also be apparent to the engineer.

From the standpoint of gradually reducing the internal diameter of the kiln from the upper feed end to the lower discharge end, this may be effected by continuously tapering the outer shell 12, as well as the inner brick lining or other refractory lining, as indicated in Fig. 5. This arrangement likewise provides for increasing the diameter of the kiln as the volume of gases and combustibles increases.

During the rotation of the kiln 10, the scoops 45 pick up feed material M from the hopper 47 and discharge it through ports 62 into the kiln to maintain the thickness of the bed of calcining material C as previously described. Such thicker bed provides longer residence time within the enlarged section 15 of the kiln so that more volatile material may be liberated. Adequate combustion of the volatile material is insured by the air which is forced into the kiln through the jet pipes 76 and jet nipples 78 which are supplied by the ring manifold 74 (or helical manifold 74a) that is connected with the blower 70 by the air pipe 75 of the air-supplying means 46 provided at the upper end of the intermediate section 17 and just below the smaller end of the tapered section 16. Thus, properly controlled amounts of air under pressure are fed into the sections 15 and 16 to burn adequately the volatile materials and to supply heat for calcination required in this section and to liberate further volatile materials from the incoming feed.

Due to the location of the feed scoops an appreciable distance down from the tail ring 20 as previously described, and due to the substantially complete combustion of the liberated volatile materials, the upper portion of the kiln above the feed scoops 45 tends to cool off, thereby decreasing the lineal velocity of the products of combustion to the kiln at this point and permitting the solid particles which might have been picked up by the gas stream to drop out. Such solid particles thus return to the moving bed, and, after proper calcination, are eventually discharged with the product. Thus, the upper portion of the kiln above the feed scoops acts as a dust collector or fines collector.

As to the feed of material M by the scoops 45 into the kiln, the structural relationship above described, including the flap gates 58, is such that each flap gate closes at a stage to avoid either introduction of air through the scoop or loss of hot gases out through the respective scoop, according to gas pressure conditions within the kiln. Entry of appreciable air at this point might tend to increase the temperature as the result of further combustion so as to injure the material of which the scoops are made. As has previously been indicated, when the axis of the scoop is directed substantially vertically upward, discharge of material therein commences, and as the scoop continues rotation for perhaps another ten to twenty degrees the materials in the scoop settle down through the curved throat 54 and are gradually discharged. About the time that each scoop has travelled through fifteen to twenty degrees from its vertical position, and before all of the treated material has been discharged, the flap gate 58 is set to close so as to prevent the previously mentioned passage of air or gases through the scoop after complete discharge of the feed material. The development of the required bed thickness of calcining material C has been described above, this being regulated by kiln rotation and rate of feed of cold material M into the hopper 47 as previously stated, and limited by the internal diameter of the tail ring at the feed end of the kiln. In order to maintain a thoroughly adequate opening at the feed end of the kiln for escape of products of combustion, it is very desirable that the internal diameter of the tail ring 20 should not be less than the internal diameter of the smallest section of the kiln nor less than the internal diameter of the nose ring at the discharge end of the kiln. Since the upper or feed end of the kiln is unobstructed, by reason of the fact that the feed scoops 45 are spaced down the kiln somewhat, such minimum internal diameter of the tail ring still leaves adequate discharge space, although it may be desirable for some operations that the internal diameter of the tail ring be somewhat greater although still providing for some increase in thickness of the calcining bed beyond that which would exist if no tail ring at all were used. It will, of course, be appreciated that the tail ring 20 may be entirely omitted, the spacing of the feed scoops 45, down the kiln being relied upon to provide a maximum bed depth desired without loss of feed materials over the adjacent kiln end. In addition, in view of the use of the peripheral feed by the scoop 45, as described, and of the fact that the open feed end of the kiln is not obstructed by conventional feed means projecting thereinto, but is free and open thereby reducing gas velocity, many of the benefits of injection of air under pressure to meet combustion requirements, as described, are obtainable without internal tapering of the kiln from a large diameter at the feed end to a smaller diameter at the discharge end, and as above indicated without necessarily making the internal diameter of the tail ring greater than that of the nose ring. Thus, such ring diameters may be equal. Also, the internal diameter of the kiln may be uniform throughout with very excellent results, at least with some feed materials.

In a specific instance, in a tapered kiln where the overall kiln length is one hundred feet, the enlarged feed section 15 is thirty-four feet in length with an internal diameter of six feet, the tapered section 16 is six feet in length and reduced to an internal diameter of about five feet, the over-all slope of the kiln is five-eighths inch per foot with the scoops 45 placed about ten feet down the kiln from the feed end, and the internal diameter of the tail ring 20 is between four and one-half and five feet and that of the nose ring is four and one-half feet, when a feed is employed varying from three hundred tons to four hundred tons per day of green petroleum coke containing about 10% to 12% of volatile combustible materials, production rates are easily attained of around 225 tons to 300 tons per day of calcined coke containing less than 1% of volatile combustible materials at kiln rotation rates around 2 R. P. M. to 2.5 R. P. M. At the discharge end of the kiln adjacent the head wall 35 negative gas pressure is attained. Through introduction of air by the means 46, fuel consumption is reduced as much as fifty percent.

As above indicated, the spacing of the scoops 45 down the kiln from the feed end may be easily calculated in units of length (feet) by dividing the bed depth desired at the scoop (inches) by the average slope per unit of length (inches per foot), and, if the tail ring 20 is used, deducting the increase of bed depth (inches) effected by the tail ring.

It is to be appreciated that as many of the air manifolds 74 and series of air jet pipes 76, or equivalent devices for supplying fluid under pressure, may be employed along the kiln length as required for any particular purpose or feed. Where additional fuel may be required for a given feed in order to obtain desired results, fuel, such as fuel gas or oil, might be introduced in addition to air, or in some instances instead of air. Thus, the present apparatus and method may be adapted for the treatment of different types of materials. For instance, low temperature carbonization of coal might be thus effected; similarly, oil shales may be treated in such an apparatus. Under the latter circumstances recoverable volatiles would be removed from the stack gases as further products of the operation.

I claim as my invention:

1. A rotary calcining kiln including: an elongated kiln body providing an interior wall having an open upper end for escape of gases and a lower end for discharge of calcined product therefrom and for entrance of primary combustion gases, said kiln body providing for a plurality of treating zones; an air manifold disposed around and mounted on said kiln body; means on said kiln body connected to said manifold to supply air under superatmospheric pressure thereto; and air-conducting means leading from said manifold through said kiln body to the interior thereof at intermediate positions along the length of said kiln body and at a plurality of spaced points extending entirely around the circumference of the kiln for injection of secondary air under pressure into said kiln continuously to create turbulence therein.

2. A kiln as in claim 1 wherein plural air manifolds and air-conducting means are mounted along said kiln body for injection of air under pressure in regulated quantities into said kiln at regions spaced along said kiln.

3. A kiln as in claim 1 wherein said air conducting means terminate at the inner surface of said kiln.

4. A kiln as in claim 1 including means for regulating the supply of air introduced into the kiln.

5. In a kiln, the combination of: a sloping, relatively large, tubular, rotatable kiln, the internal diameter of said kiln being greater at its upper end than at its lower end and said upper end being free of all obstructions; means for introducing raw material to be treated through the side wall of said kiln between the ends thereof; air-compressing means mounted on the exterior of said kiln, and means mounted on said kiln for directing a plurality of circumferentially spaced jets of air from said compressing means inwardly toward the center of said kiln.

6. A kiln as defined in claim 5 wherein said means for introducing raw material are between said jet-directing means and said upper end.

7. A kiln as defined in claim 5 wherein the internal surface of said kiln is defined by axially aligned cylindrical portions of successively greater diameter toward said upper end; said jet-directing means being located adjacent the juncture of adjacent cylindrical portions.

8. The method of calcining petroleum coke and other carbonaceous substance containing volatiles, including the steps of: continuously advancing a layer of the substance along the bottom of a generally horizontally extending tubular enclosure of relatively large cross-sectional area; continuously agitating the substance in a direction transverse to its direction of advance; discharging the substance from one end of said enclosure; supplying heat to said enclosure to drive volatiles from the substance; discharging gaseous products from the other end of said enclosure; and jetting circumferentially spaced streams of air substantially radially into said enclosure around the sides and top thereof intermediate the ends thereof, under superatmospheric pressure and directing said streams toward the axial center of said enclosure whereby to agitate and intimately mix all gases therein, prevent stratification thereof, and promote complete combustion of said volatiles to thereby heat said substance; continuously moving said streams of air circumferentially of said enclosure; partially obstructing flow of said substance through said enclosure at longitudinally spaced points to increase the thickness of the entire width of said layer at said points; jetting said circumferentially spaced streams into said enclosure adjacent said points of obstruction; and providing increased space for said air and volatiles from said points toward said other end.

9. A method as in claim 8 wherein the agitation of the substance is effected by rotation of the tubular enclosure, and advance of the substance is effected by inclination of the tubular enclosure.

References Cited in the file of this patent

UNITED STATES PATENTS

| | | |
|---|---|---|
| 325,259 | Mathey | Sept. 1, 1885 |
| 568,599 | Bonneville | Sept. 29, 1896 |
| 1,415,990 | Carstens | May 16, 1922 |
| 1,477,517 | Newberry | Dec. 11, 1923 |
| 1,564,730 | Walden | Dec. 8, 1925 |
| 1,696,857 | Newhouse | Dec. 25, 1928 |
| 1,707,191 | Minogue | Mar. 26, 1929 |
| 2,082,970 | Overman | June 8, 1937 |
| 2,319,548 | Kronstad | May 18, 1943 |
| 2,484,911 | Seil | Oct. 18, 1949 |
| 2,710,280 | Borch | June 7, 1955 |

FOREIGN PATENTS

| | | |
|---|---|---|
| 206,245 | Great Britain | C. A. Nov. 5, 1923 |